United States Patent [19]
Hecht et al.

[11] Patent Number: 5,369,994
[45] Date of Patent: Dec. 6, 1994

[54] FLOW SENSOR

[75] Inventors: Hans Hecht, Korntal; Josef Kleinhans, Vaihingen/Enz; Rudolf Sauer, Benningen; Eckart Reihlen, Reutlingen; Ulrich Kuhn, Renningen-Malmsheim, all of Germany

[73] Assignee: Robert Bosch GmbH, Stuttgart, Germany

[21] Appl. No.: 94,218

[22] Filed: Jul. 21, 1993

[30] Foreign Application Priority Data

Jul. 21, 1992 [DE] Germany .............. 4223968

[51] Int. Cl.$^5$ .................................... G01F 1/68
[52] U.S. Cl. .................................... 73/204.16
[58] Field of Search .......... 73/204.16, 204.18, 204.19, 73/204.25, 204.26, 204.27

[56] References Cited

U.S. PATENT DOCUMENTS

| | | |
|---|---|---|
| 4,135,396 | 1/1979 | Stanke ........................ 73/204.19 |
| 4,344,322 | 8/1982 | Plapp ......................... 73/204.27 |
| 4,501,144 | 2/1985 | Higashi et al. |
| 4,739,657 | 4/1988 | Higashi et al. ............... 73/204.16 |
| 4,777,820 | 10/1988 | Hecht et al. |
| 4,884,443 | 12/1989 | Lee et al. ................... 73/204.26 |
| 5,072,614 | 12/1991 | Hisanaga ..................... 73/204.19 |

Primary Examiner—Herbert Goldstein
Attorney, Agent, or Firm—Walter Ottesen

[57] ABSTRACT

The invention is directed to a flow sensor having a heater, two temperature measuring sensors, a heater temperature sensor and a medium temperature sensor. A control circuit is provided which controls the overtemperature of the heater in dependence upon the temperature of the flowing medium. With this arrangement, the influence of the temperature dependency of the following on the sensor characteristic are compensated: viscosity, thermal conductance and thermal capacity of the medium. The relationship between the heater temperature and the temperature of the medium is adjusted in a slightly nonlinear manner by means of special evaluation circuits. In this way, a further improvement of the temperature compensation is obtained.

18 Claims, 4 Drawing Sheets

FLOW SENSOR

BACKGROUND OF THE INVENTION

A flow sensor having a sensor unit disposed in an air flow is disclosed in U.S. Pat. No. 4,501,144. A heater and two temperature sensors are arranged on the sensor unit. Of the two temperature sensors, one is disposed forward of the heater when viewed in the direction of flow and the other sensor is disposed rearward of the heater. The two temperature sensors are arranged in a measuring bridge and the measuring signal is formed from a comparison of the resistance values. The temperature of the heater is controlled in such a manner that the overtemperature, that is, the temperature difference between heater and air flow, is constant. A constant overtemperature has, however, the disadvantage that the temperature dependency of the sensor characteristic cannot be completely compensated.

U.S. Pat. No. 4,777,820 discloses a flow sensor wherein the overtemperature is a function of the air temperature in order to compensate for the temperature dependency of the sensor characteristic. The measurement of the sensor signal takes place by means of the measurement of the voltage of the heater resistor. The correction of the temperature dependency of the characteristic of the sensor is limited because of this measuring principle.

SUMMARY OF THE INVENTION

It is an object of the invention to provide a flow sensor wherein a still better correction of the temperature dependency of the characteristic of the sensor is provided.

It is especially advantageous to track the overtemperature of the heater in such a manner that the physically unavoidable error sources of the characteristic are compensated for. These error sources include the temperature dependency of the thermal conduction, the thermal capacity and the viscosity of the flowing medium. The heater temperature can be measured independently of the state of the heater when the control means includes its own heater temperature sensor. A medium temperature sensor is purposeful to measure the medium temperature reliably and without being influenced by other parts of the sensor. The speed with which the sensor responds to changes of the flow intensity is increased in that the heater, the heater temperature sensor and the temperature measuring sensor are all arranged on a thin dielectric membrane having a low thermal capacity.

The manufacture of the sensors is especially simple and therefore cost effective because of the use of silicon technology. In the simplest embodiment, the heater is configured as an ohmic resistor and the temperature measuring sensors, the medium measuring sensor and the heater temperature sensor are all configured as temperature-dependent resistors. The temperature dependency of the sensor characteristic is held low ab initio when all measuring resistors, which measure temperature, are made of the same material. It is especially simple to configure the evaluation means as well as the control means as analog bridge circuits. The zero point and the slope of the temperature compensation of the control means are adjusted by means of two adjustable resistors in the control bridge.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
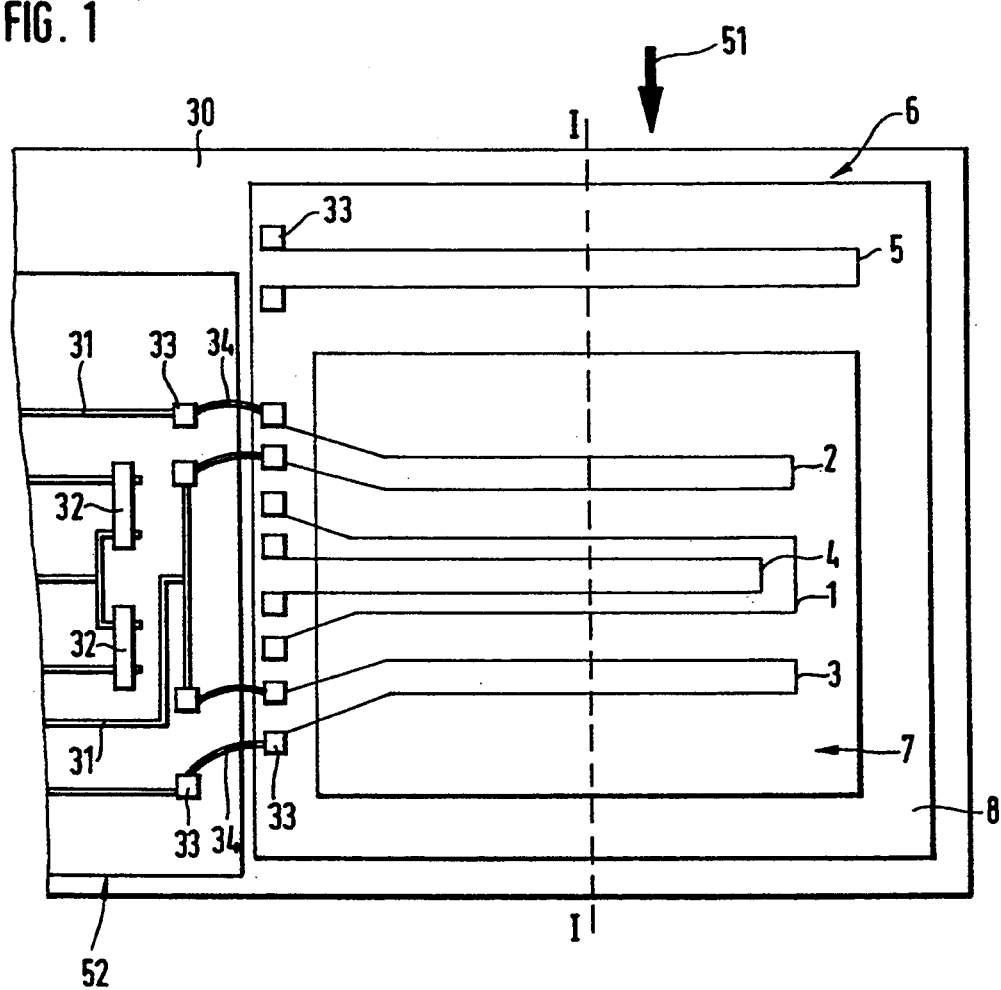
FIG. 1 is a plan view of a flow sensor according to an embodiment of the invention.

Referring to FIG. 1, a sensor unit 6 is arranged on a carrier 30 in such a manner that it is disposed in the flow of the medium indicated by the arrow 51. The sensor unit 6 includes a frame 8 of a crystalline silicon and a dielectric membrane 7. A heater 1, two temperature measuring sensors (2, 3) and a heater temperature sensor 4 are arranged on the membrane 7. A medium temperature sensor 5 is disposed on the frame 8. The elements arranged on the sensor unit 6 are connected to the thick-film circuits on the carrier 30 via bond pads 33 and bond leads 34. The thick-film circuits are comprised of thick-film conductor paths 31 and thick-film resistors 32. A venting hole 35 is provided in the carrier 30 on the lower side of the membrane 7.

The sensor unit 6 is produced pursuant to conventional micromechanical methods. Here, a silicon wafer is appropriate, with a thin dielectric layer being deposited on the surface of the wafer. The membrane 7 is structured from this wafer by etching the silicon with an etching solution which does not attack the thin dielectric layer. The wafer is separated into parts with a saw or by additional etching steps so that the frame 8 results.

Silicon oxide or silicon nitride is suitable, for example, as a material for the membrane 7. However, other materials can also be used such as thin plastic layers. The essential feature of membrane 7 is that it has only a slight thermal conductivity and thermal capacity because of its thin configuration as well as because of the material.

A plurality of materials can be used for the carrier 30 such as enamelled steel substrates, glass or ceramic plates made of aluminum oxide. The heater 1, the temperature measuring sensors (2, 3), the heater temperature sensor 4 and the medium temperature sensor 5 comprise thin structured metallic layers. Platinum, for example, is a material which can be used for these metallic layers.

To produce the structured metallic layers, tile entire surface of tile sensor unit 6 is first coated with a continuous metal film. The structures for the heater 1, the temperature measuring sensors (2, 3), the heater temperature sensor 4 and the medium temperature sensor 5 are all etched out of the surface layer utilizing photolithography and etching. When following this procedure, it is especially advantageous that all the temperature measuring elements are made of the same material and therefore also have the same temperature dependency of its resistance. This can especially be utilized when two elements always operate differentially with respect to each other for all temperature measurements because, in this way, the resistance changes caused by temperature changes cancel each other out. Furthermore, it is an advantage with this procedure that the geometric spacings of all elements to each other and especially the relative spacings of the two temperature measuring sensors (2, 3) to the heater 1 can be caused only by possible errors of the mask utilized in the photolithography. These errors can, however, be very easily avoided. To amplify the measuring effect, it is very possible to use meander structures in lieu of the simple loops shown here.

The thick-film substrate having the thick-film circuits is glued onto time carrier 30. The thick-film circuits comprise conductor paths 31 and thick-film resistor elements 32 and should be understood to be only one possible embodiment. Accordingly, the bonded leads 34 for contacting the temperature measuring sensors (2, 3) are only shown as being exemplary. The heater 1, the heater temperature sensor 4 and the medium temperature sensor 5 are contacted in the same manner. In addition to the thick-film resistor element 32, still further elements such as differential amplifiers or the like can be provided. Furthermore, a complete evaluation circuit can, for example, be integrated into the silicon of the frame 8. The bond pads 33 would then only still serve to provide an electrical contact of these circuit loops to the ambient. Likewise, additional circuit elements can be realized with thin-film technology on the carrier 30.

The two temperature measuring sensors (2, 3) are here configured as temperature-sensitive resistors, that is, a conclusion can be drawn as to the temperature of the membrane at this location from a measurement of the resistance of these resistors. The two temperature measuring sensors (2, 3) are heated by the heater 1 to a temperature which lies above the temperature of the flowing medium. A temperature exchange takes place between the medium and the membrane and is dependent upon the temperature difference between the particular locations of the membrane and the medium.

The temperature measuring sensor 3 is disposed rearward of the heater 1 when viewed in flow direction as indicated by arrow 40. For this reason, the heat transfer from the temperature measuring sensor 3 to the flowing medium is less because the medium already has a higher temperature because of the heater 1. The temperature difference arising in this manner between the temperature measuring sensor 2 and the temperature measuring sensor 3 is a measure of the mass flow of the medium flowing past. This temperature difference is evaluated by the circuit shown in FIG. 3.

Figure 2:
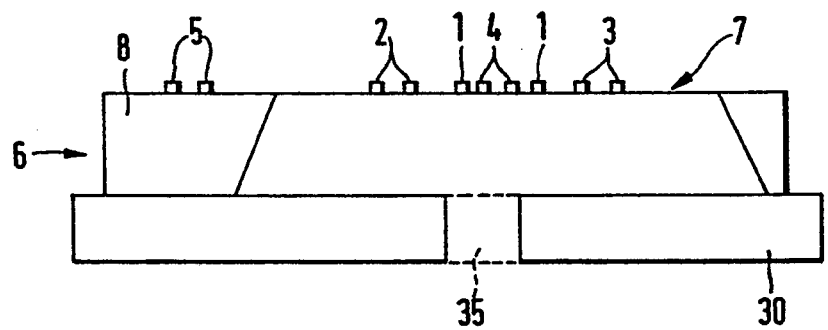
FIG. 2 is a section view taken along line II—II of FIG. 1.
Figure 3:
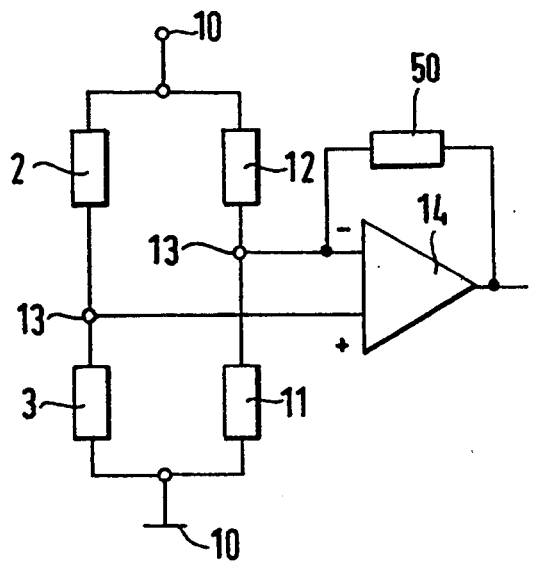
FIG. 3 is a circuit diagram of the evaluating means.

A bridge circuit is shown in FIG. 3 and two bridge branches are arranged across the supply voltage 10. The two temperature measuring sensors (2, 3) are connected in series in one bridge branch. In the other bridge branch, two additional resistors (11, 12) are likewise connected in series. The two additional resistors (11, 12) can, for example, be realized by the two thick-film resistor elements 32 shown in FIG. 2. The center taps 13 of the respective bridge branches are connected to the difference forming means 14. The difference forming means 14 emits a signal which is proportional to the voltage difference at the two points 13. The two temperature measuring sensors (2, 3) are so configured that they have the same resistance at the same temperature. If this is not the case because of manufacturing tolerances, then the resistors (11, 12) must be correspondingly adjusted so that the bridge is balanced for the same temperature of the two temperature measuring sensors (2, 3). A temperature difference between the temperature measuring sensor 2 and the temperature measuring sensor 3 causes a corresponding unbalance of the bridge which, in turn, results in an output signal of the difference forming means 14.

Figure 4:
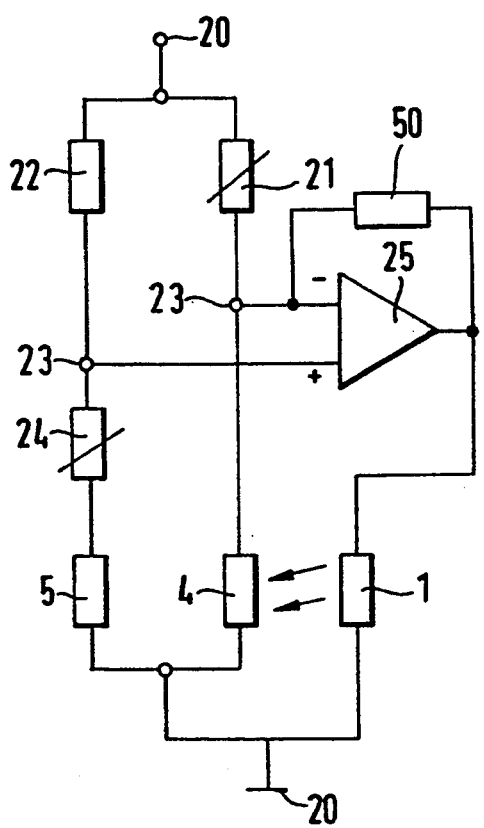
FIG. 4 is a circuit diagram of the control means.

FIG. 4 shows the control of the overtemperature of the heater. This overtemperature is the temperature difference between the heater and the flowing medium. A measuring bridge having two bridge branches is arranged across the supply voltage 20. In one bridge branch, the medium temperature sensor 5 is connected in series with a further resistor 22. A further adjustable resistor 24 is provided in series with the medium temperature sensor 5. The heater temperature sensor 4 is connected in series with a further resistor 21 in the other bridge branch. The resistor 21 is adjustable. The center taps 23 of the respective bridge branches are connected to a controller 25. The controller 25 generates an output voltage which is dependent upon the difference of the two voltages at the center taps 23 of the bridge branches. The heater 1 is connected to the output voltage of the controller 25. As shown by the two arrows, the heater 1 and the heater temperature sensor 4 are in thermal contact; that is, the heater temperature sensor 4 is approximately at the temperature of the heater 1. The additional resistors (21, 22, 24) can, for example, be realized by thick-film resistors 32 on the carrier 52.

In order to explain the operation of the bridge, the premise is taken that the temperature of the flowing medium does not change. In this case, the voltage at the center tap 23 of the bridge, in which the medium temperature sensor 5 is arranged, remains constant. A control of the heater temperature is then obtained only by means of the other bridge branch in which the heater temperature sensor 4 is arranged. The heater 1 and the heater temperature sensor 4 are in thermal contact, that is, the heater temperature sensor 4 measures the temperature of the heater 1. Changes of the temperature of the heater 1 can, for example, be caused by an increase of the through-flow quantity. These changes cause that bridge branch to become unbalanced in which the heater temperature sensor 4 is mounted and this unbalance is such that the heating capacity of the heater 1 is increased. The same applies when the temperature of the heater 1 is increased. With this control, the condition is obtained that the temperature of the heater 1 has a constant value. This value is now varied in that the effect of the second bridge branch, in which the medium temperature sensor 5 is arranged, is considered. The overtemperature of the heater 1 is adjusted with respect to the medium by means of this branch. A temperature change of the medium effects an unbalance of the bridge branch in which the medium temperature sensor 5 is arranged. The overtemperature of the heater 1 is adjusted with respect to the medium by means of this branch. Any desired dependency can be selected by means of the adjustable resistors 21 and 24.

The control circuit for the heater temperature shown in FIG. 4 defines simultaneously an evaluation circuit for the flow sensor because the output signal of the controller 25 is a measure for the quantity of air which flows by. This circuit is therefore utilized in U.S. Pat.

No. 4,777,820 as a complete evaluation circuit for the flow sensor. However, this circuit cannot be completely balanced. To maintain tile heater 1 at a specific overtemperature even in tile case wherein no medium flows, a certain unbalance of the bridge must be provided since, otherwise, no voltage could be applied to the heater 1.

When the heater voltage is applied as the sensor output signal, then the heater quiescent voltage defines an offset of the characteristics which, if possible, has a temperature dependency. This zero point offset of the characteristic leads to a residual error even for a corresponding configuration of the adjustable resistors (21, 24) which cannot be compensated. This disadvantage is avoided in that a separate evaluation circuit for the sensor signal is used according to FIG. 3. This evaluation circuit has a characteristic which passes precisely through the zero point because of the measuring principle used.

By means of the combination of the two circuits for controlling temperature according to FIG. 4 and evaluation according to FIG. 3, the characteristic of the sensor with respect to the temperature is compensated much better than this would be possible for each individual circuit. It is especially possible to consider the temperature dependency of the physical constants of the air such as the temperature dependency of the viscosity, the thermal conductivity and the thermal capacity without a zero point error occurring in the characteristic which can hardly be compensated. Furthermore, the temperature dependency of the difference formation means 14 and 25 are considered.

Figure 5:
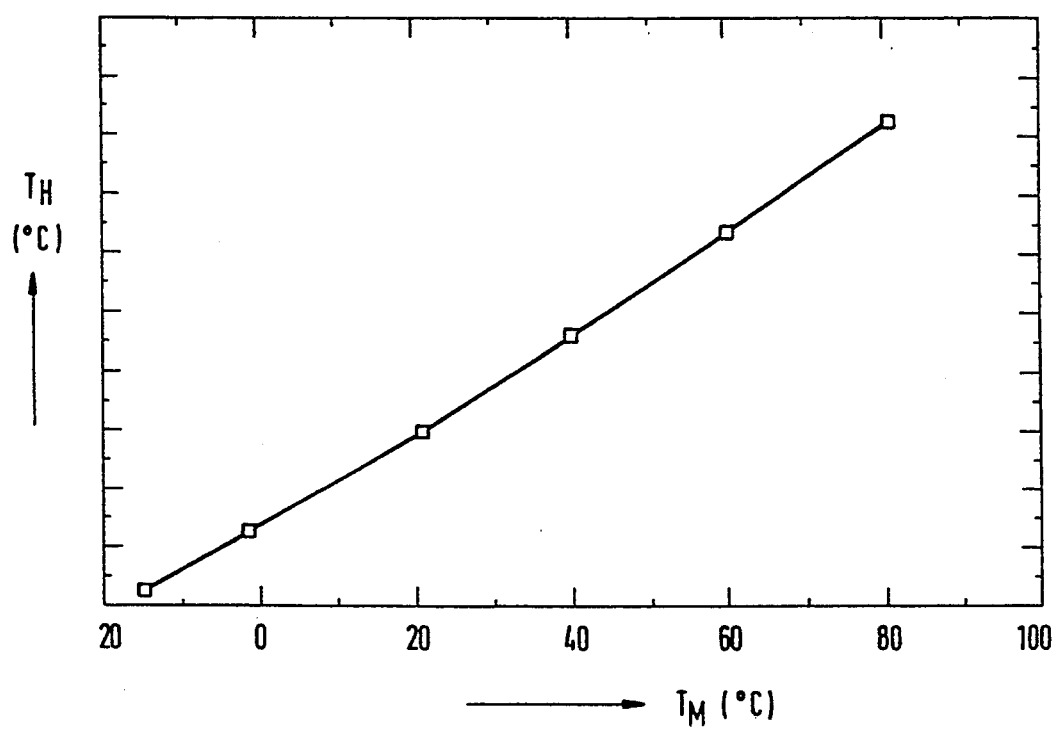
FIG. 5 is an example of a characteristic wherein the temperature of the heater is plotted as a function of the temperature of the medium with this characteristic leading to an optimal temperature compensation.

An optimal compensation is obtained in that the temperature dependence between heater and medium is realized in a suitable manner. The function $T_H = f(T_M)$ leads to an optimal temperature compensation of the characteristic and is shown in FIG. 5. Here, the temperature $T_H$ is the average temperature along the heater track and $T_M$ is the temperature of the medium. The dependence is slightly nonlinear and can be excellently approximated by a polynomial of the second order having positive coefficients.

Figure 6:
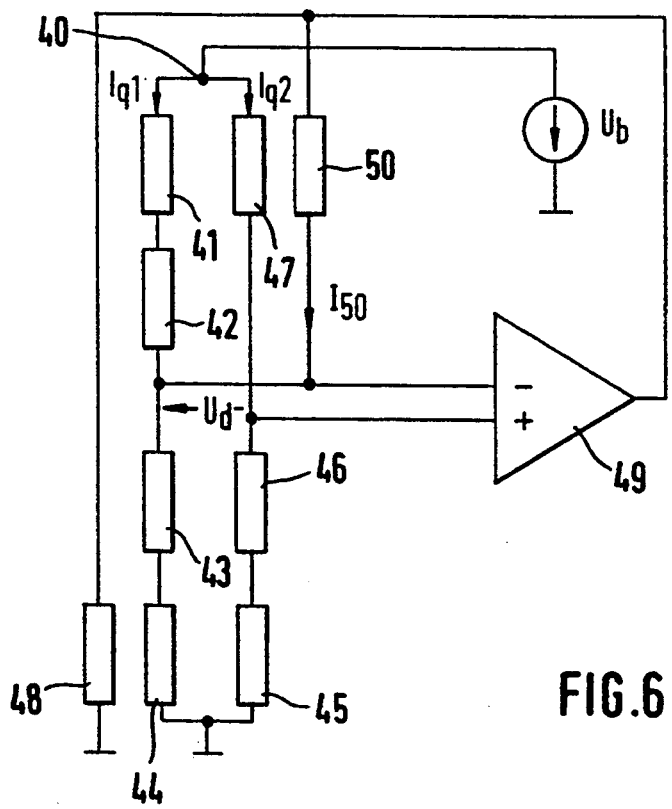
FIG. 6 is an embodiment of a circuit which permits the exemplary characteristic of FIG. 5 to be electronically independently adjusted; and, FIG. 7 is another embodiment of a circuit which permits the exemplary characteristic of FIG. 5 to be electronically adjusted independently.

A circuit is shown in FIG. 6 which electronically automatically adjusts this dependency.

The bridge circuit of FIG. 6 is connected across the supply voltage Ub and ground. The supply voltage Ub is supplied via terminal 40. The bridge circuit includes the actual bridge having the resistors 41 to 47. The resistors 41, 45 and 47 are nominally temperature-independent resistors such as commercially available film resistors and thick-film planar resistors having a temperature coefficient which can be at most a maximum of a few hundred ppm/Kelvin.

The resistor 42 (the so-called compensating resistor), the resistor 43 (the so-called feed resistor), the resistor 46 (the so-called medium temperature sensor) and the resistor 44 (the so-called heat sensor) are all temperature sensors; that is, these resistors are ohmic resistors and have a single definitive temperature dependency associated therewith or, more specifically, they have a reversible definitive temperature dependency. These resistors can be considered to be medium temperature sensors. The temperature dependency of these resistors can be expressed, for example, by a temperature function:

$$R(T) = R(0°\text{ C.})[1 + (a)T + (g)T^2]$$

wherein: the coefficient (a) is greater than zero and the coefficient (g) is less than zero. The value of each coefficient is dependent upon the resistance material and on the manufacture.

In addition to resistors 41 to 47, a heater resistor is provided which is identified by reference numeral 48 and the heat sensor 44 is so arranged that the heater and the heat sensor 44 have approximately the same temperature. The resistors 42, 43 and 44 are approximately at the temperature of the medium.

The bridge configured from the above-mentioned resistors is supplied from a constant voltage source which is independent of temperature. The voltage Ub is supplied by the voltage source via terminal 40. The bridge difference voltage Ud is amplified by a control amplifier 49 and the output thereof is fed to the heater resistor 48.

The controller output is fed back via a component 50 to the inverting input. The component 50 can be defined by a real or complex transfer function and can also be used in the circuits of FIGS. 3 or 4. The self warming of the resistors 42, 43, 44 and 46 caused by the bridge branch currents Iq1 and Iq2 is held as low as possible by corresponding resistor selection and heat dissipation.

The controller 49 controls the bridge difference voltage Ud to zero by means of the warming of the heater resistor 48 and therefore the warming of the heat-sensing resistor 44. This is the control condition. The feedback component 50 ensures an adequate stability of the control loop. The current I50 is fed from component 50 into the bridge and is negligible in a first approximation. Accordingly, the control condition is then determined by:

$$(R41 + R42)/R47 = (R43 + R44)/(R46 + R45)$$

wherein: R41, R42, et cetera are intended as the resistance values corresponding to the resistors.

A dependency of the heater temperature on the temperature of the medium as shown in FIG. 5 is obtained when the temperature dependencies for the resistors 41 to 47 are inserted into the above equation and resolved for the heater temperature. This dependency is shown in FIG. 5. Accordingly, the following equation applies:

$$T_H = a0 + a1^* T_M + a2^* T_M^2$$

wherein: the coefficients a0, a1, a2 are greater than zero with an appropriate selection of resistance.

This is the desired dependency of the heater temperature $T_H$ on the temperature of the medium $T_M$. The dependency is slightly nonlinear and approximates a polynomial of the second order having positive coefficients.

Usually, the bridge resistors stray about their desired value so that the coefficients a0, a1 and a2 likewise stray about their desired values. For this reason, the resistors 41, 45 and 47 are configured as thick-film planar resistors which can be trimmed. A special advantage is that all three coefficients a0, a1 and a2 can be converted from the actual values to the particular desired values by trimming the resistors 41, 45 and 47. It is therefore not necessary to trim the temperature sensors 42, 43, 44 and 46.

Figure 7:
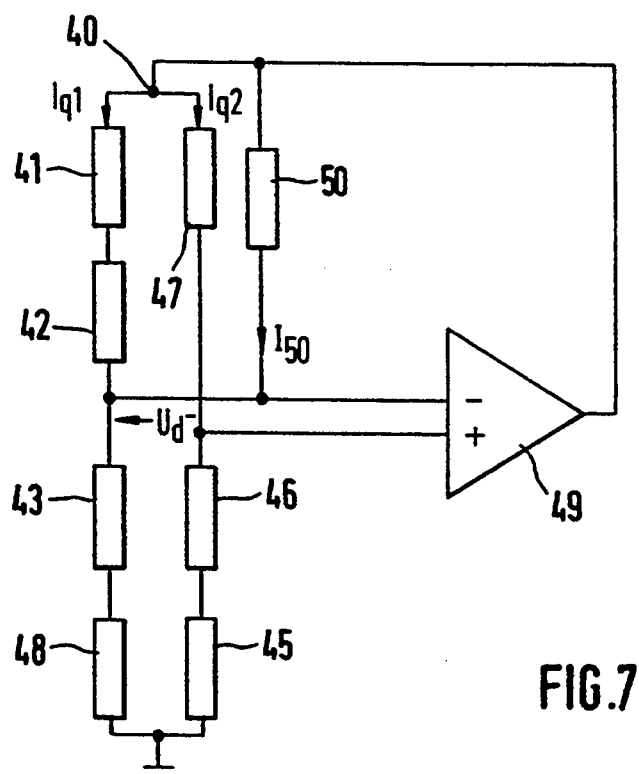

A circuit alternate to the circuit of FIG. 6 is shown in FIG. 7. In FIG. 7, the same components are again identified by the same reference numerals. In the bridge, the heater sensor 44 is substituted by the heater resistor. The bridge is supplied directly by the controller output.

The warming of the bridge elements 41, 42, 43, 44, 45, 46 and 47 by means of the bridge branch currents Iq1 and Iq2 is held as low as possible because of an appropriate resistance selection and heat dissipation.

In contrast, the heater resistor 48 is warmed by the bridge branch current Iq1. The same control condition applies here as for the circuit of FIG. 6. Accordingly, the function of the circuit shown in FIG. 7 is identical to the circuit shown in FIG. 6. However, the heater sensor 44 can be eliminated in the circuit of FIG. 7.

It is understood that the foregoing description is that of the preferred embodiments of the invention and that various changes and modifications may be made thereto without departing from the spirit and scope of the invention as defined in the appended claims.

What is claimed is:

1. A flow sensor for detecting the mass flow of a medium moving in a predetermined flow direction and having a medium temperature, the medium further having a thermal conductivity, a thermal capacity and a viscosity, the flow sensor comprising:
   a sensor element;
   a heater mounted on said sensor element and having a heater temperature greater than said medium temperature with the difference of said temperatures defining an overtemperature of said heater;
   at least first and second temperature measuring sensors mounted on said sensor element and being arranged relative to said heater so as to permit said heater to impart heat to said temperature measuring sensors;
   said first temperature measuring sensor supplying a first signal and being disposed forward of said heater when viewed in said flow direction and said second temperature measuring sensor supplying a second signal and being disposed rearward of said heater;
   control means for controlling said overtemperature of said heater in dependence upon said medium temperature so as to cause said overtemperature to become higher when said medium temperature increases; and,
   evaluation means for measuring said first and second signals to form a sensor signal therefrom indicative of the mass flow of said medium.

2. The flow sensor of claim 1, said flow sensor having a characteristic defining a relationship between said heater temperature and said medium temperature; said characteristic being influenced by said thermal conductivity, said thermal capacity and said viscosity of said medium; and, said control means including means for controlling said overtemperature to compensate for said influence on said characteristic of said thermal conductivity of said medium, said thermal capacity of said medium and said viscosity of said medium.

3. The flow sensor of claim 2, said control means including a heater temperature sensor for measuring the temperature of said heater.

4. The flow sensor of claim 3, said control means including a medium temperature sensor for measuring said medium temperature.

5. The flow sensor of claim 4, further comprising a frame made of monocrystalline silicon; a thin dielectric membrane stretched over said frame; and, said heater, said heater temperature sensor and said first and second temperature measuring sensors being arranged on said membrane.

6. The flow sensor of claim 5, said heater being an ohmic resistor.

7. The flow sensor of claim 4, said first and second temperature measuring sensors, said medium temperature sensor and said heater temperature sensor being configured as respective temperature-dependent resistors.

8. The flow sensor of claim 7, said first and second temperature measuring sensors, said medium temperature sensor and said heater temperature sensor all being made of the same material.

9. The flow sensor of claim 7, said evaluation means including: a voltage supply and a bridge circuit having two bridge branches connected across said voltage supply; one of said bridge branches including said first and second temperature measuring sensors connected in series to conjointly define a first center tap carrying a first center tap signal; and, the other one of said bridge branches including two resistors connected in series to conjointly define a second center tap carrying a second center tap signal; and, difference forming means for receiving said first and second center tap signals for forming said sensor signal indicative of the mass flow of said medium.

10. The flow sensor of claim 7, said control means including a voltage supply and a bridge circuit having two bridge branches connected across said voltage supply, one of said bridge branches including said medium temperature sensor and a first resistor connected in series to conjointly define a first center tap carrying a first center tap signal; the other one of said bridge branches including said heater temperature sensor and a second resistor connected in series to conjointly define a second center tap carrying a second center tap signal; and, difference forming means for receiving said first and second center tap signals and forming a control signal for controlling said overtemperature of said heater.

11. The flow sensor of claim 10, one of said first and second resistors being an adjustable resistor; and, said one bridge branch including an additional adjustable resistor connected in series with said medium temperature sensor.

12. The flow sensor of claim 10, said medium temperature sensor, said heater temperature sensor and said first and second resistors all having different resistance temperature dependencies.

13. The flow sensor of claim 1, further comprising a circuit arrangement for generating a relationship between the heater temperature ($T_H$) and the medium temperature ($T_M$): and, said relationship being defined approximately by a polynomial of the second order having positive coefficients.

14. The flow sensor of claim 13, said relationship defining a dependency of said heater temperature ($T_H$) on said medium temperature ($T_M$) which is expressed by the equation:

$$T_H = a0 + a1(T_M) + a2(T_M^2)$$

wherein a0, a1 and a2 are all greater than zero.

15. The flow sensor of claim 13, said circuit arrangement including a plurality of temperature-independent resistors and a plurality of ohmic resistors having a definitive temperature dependency thereby compensating said temperature-independent resistors; and, said temperature-independent resistors being film resistors or thick-film planar resistors.

16. The flow sensor of claim 13, wherein said circuit arrangement is adapted to electronically adjust said relationship between said heater temperature ($T_H$) and said medium temperature ($T_M$) automatically.

17. The flow sensor of claim 16, said circuit arrangement and said evaluation means comprising:
- a bridge circuit; said bridge circuit including a plurality of first resistors defining a first branch of said bridge circuit and a plurality of second resistors defining a second branch of said bridge circuit; said bridge circuit having taps in said branches, respectively, across which a bridge voltage is formed;
- selected ones of said first and second resistors being temperature-independent resistors and the remainder of said first and second resistors being ohmic resistors having a definitive temperature dependency;
- a controller having first and second inputs for receiving said bridge voltage and said controller having an output;
- a resistor connecting said output to ground;
- said second input of said controller being an inverting input; and,
- a feedback resistor for connecting said output to said inverting input.

18. The flow sensor of claim 16, said circuit arrangement and said evaluation means comprising:
- a bridge circuit; said bridge circuit including a plurality of first resistors defining a first branch of said bridge circuit and a plurality of second resistors defining a second branch of said bridge circuit; said bridge circuit having taps in said branches, respectively, across which a bridge voltage is formed;
- selected ones of said first and second resistors being temperature-independent resistors and the remainder of said first and second resistors being ohmic resistors having a definitive temperature dependency;
- a controller having first and second inputs for receiving said bridge voltage and said controller having an output;
- said output being connected to one of said resistors of said first branch and to one of said resistors of said second branch;
- said second input of said controller being an inverting input; and,
- a feedback resistor for connecting said output to said inverting input.

* * * * *

UNITED STATES PATENT AND TRADEMARK OFFICE
CERTIFICATE OF CORRECTION

PATENT NO. : 5,369,994
DATED : 11/29/94
INVENTOR(S) : Hans Hecht, Josef Kleinhans, Rudolf Sauer, Eckart Reihlen and Ulrich Kuhn It is certified that error appears in the above-identified patent and that said Letters Patent is hereby corrected as shown below:

In column 2, line 62: delete "tile" and substitute -- the -- therefor.

In column 1, line 63: delete "tile" and substitute -- the -- therefor.

In column 3, line 19: delete "time" and substitute -- the -- therefor.

In column 5, line 3: delete "tile" and substitute -- the -- therefor.

In column 5, line 4: delete "tile" and substitute -- the -- therefor.

In column 8, line 51: delete ":" and substitute -- ; -- therefor.

In column 8, line 59: delete "$T_H a0 + a1(T_M) + a2(T_M^2)$" and substitute -- $T_H = a0 + a1(T_M) + a2(T_M^2)$ -- therefor.

Signed and Sealed this

Fourteenth Day of February, 1995

Attest:

BRUCE LEHMAN

Attesting Officer    Commissioner of Patents and Trademarks